United States Patent Office 3,491,323
Patented Jan. 20, 1970

3,491,323
MOISTURE PROOF BIMETALLIC ELEMENT
Age Mølgard, Mollehavn 23, Nordberg, and Øjvind
Fredslund Schøler, Brorsonsvej 37, Herning, both
of Denmark
Filed Apr. 29, 1965, Ser. No. 451,726
Claims priority, application Germany, Apr. 30, 1964,
D 44,308
Int. Cl. H01h 71/16, 61/00
U.S. Cl. 337—379    4 Claims

ABSTRACT OF THE DISCLOSURE

A bimetallic element having a bimetallic strip hermetically encased in a thin flexible plastic cover that allows heat transfer and bending of the bimetallic strip without undue lag or delay and without impeding the bending characteristics of the strip. A hole is provided for mounting a connector outwardly of the protective cover. A tab of non corrosive material is provided and used for holding the bimetallic strip during coating thereof in a fluidized bed of epoxy resin or polyamides. This tab remains uncovered.

Figure 1:
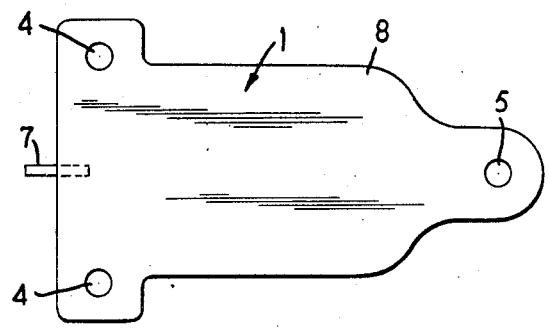

The present invention relates to bimetallic elements for use in moist, damp and corrosive working environments, and more particularly to an element of this type used in a submerged condition.

Elements, useful, for example to control mixing valves for cold and hot water, in which the element is placed within the water having bimetallic elements exposed for some time to damp working environments, show certain deterioration which may generally be regarded as corrosion. Corrosion shortens the lifetime of the element, causes contamination of the water due to rust flaking off, and the characteristic of the bimetallic element itself is affected. To minimize the difficulties bimetallic elements are now being made of stainless metals. Although such bimetallic elements are considerably more expensive, they do not achieve all the desired results. Furthermore, one still finds certain deterioration takes place, although not to the same extent as experienced with the bimetallic elements used previously.

It is an object of the invention to provide a submersible bimetallic element which is not subject to the mentensioned difficulties and consequently has a longer lifetime and maintains the same characteristics.

Briefly, according to the invention, the problem is solved by means of a thin protective cover of an elastic plastic material which is both moisture or waterproof and adheres to the element. The invention is based on the realization that attempts to avoid corrosion by choice of base materials for the composition of the bimetallic element will not lead to a solution of the problem. A considerable amount of corrosion is not caused simply by surace oxidation due to moisture, but rather electrolytic corrosion which is inherent when the different metals come in contact with an electrolyte. Thus, corrosion predominantly arises due to the difference of electrical activity of the metals, in the electromotive series, which are used. However, bimetallic elements, by definition, use two different metals. Other metals, for example pipe fittings, or the tank itself, usually are present in the system, in which such bimetallic elements are used, which should be temperature controlled, and contribute to electrolytic corrosion or dissociation.

The present invention takes the approach that it is best to protect the bimetallic element against the damp atmosphere. This approach is quite unusual for such elements, since protective covers may influence and interfere with the important functions of the bimetallic element: (1) free movement of the bimetallic element under influence of change in temperature; and (2) free heat absorption from the environment. The more attention one pays to the first function by putting a protective cover quite loosely around the bimetallic element, the more the second function, response to temperature change, is disturbed.

According to the invention, a protective cover is applied to a bimetallic element and is chosen to have characteristics of such a nature that its influence on free functions, and resopnse is a minimum. Thus, a submersible bimetallic element is obtained that does not change characteristics under the influence of dampness, contrary to expectations. The cover is a thin protective cover sticking tightly to the bimetallic element and is made of an elastic plastic material which does not, or at any rate, not in any noticeable way, influence the free movement of the bimetallic element since the force of movement of the bimetallic element is large with respect to the restraint imposed by the protective cover. Moreover, the thin protective cover sticks to the bimetallic element without any air space therebetween and introduces only a relatively small resistance to heat transfer. Bimetallic elements usually do not react immediately upon change of temperature, as the adaptation of the mass of the bimetallic element to the new temperature always requires a certain amount of time. Thus, the reaction speed of the bimetallic element is only slightly reduced, if at all.

The thickness of the protective cover depends on its requirements. Generally, the protective cover should be chosen as thin as possible consistent with tighness against moisture. For most of the plastic materials which can be used according to the invention a thickness of 0.2 mm. or less would be suitable. Especially good results were obtained by means of a protective cover of epoxy or of polyamides such as nylon 1111.

The simplest way to coat the bimetallic element with the protective cover is to immerse the element into molten plastic raw material. When the bimetallic element is first heated and then immersed into a plastic fluidized bed, a thin protective cover of an even thickness is obtained. However, the bimetallic element will not receive a protective cover at the point where the tools holding the element were placed. Where the cover is missing surface corrosion takes place. Consequently it is advisable to place the holding tools at a point where corrosion affects the characteristics of the bimetallic element as little as possible, for instance at a point between a pair of fastening holes. It is considerably more advantageous, however, in accordance with a feature of the invention, if the bimetallic element is provided with a small holding strip or tab of stainless, that is corrosion resistant material. In particular this strip or tab might consist of the same material, or at any rate a material electrically similar to that used for the one of the layers of the bimetallic element to which it is secured. The bimetallic element may then be held at this strip when being immersed into the plastic material. The result is that the holding strip is only partly covered by the protective coating. This, however, is quite harmless as the remainder of the element itself, that is the bimetallic portion, is absolutely covered, so that no electrolytic voltage arises due to exposure of two dissimilar metals of the bimetallic element. Furthermore, destruction of the small strip or tab subsequent to the time it was needed, that is, to serve as a holding strip during manufacture, does not influence the operating characteristics of the bimetallic element.

Figure 2:
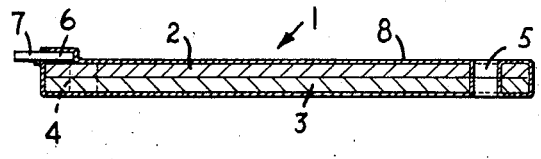

The structure, organization and operation of the invention will now be described more specifically in the following detailed description with reference to the accompanying drawings, in which:

FIG. 1 is a plan view of a bimetallic element before the application of the protective cover, and FIG. 2 is a longitudinal section view, on an enlarged scale, through the element after application of the protective cover.

Referring now to the drawings: A bimetallic element 1 in FIG. 1 has the usual structure and form. It consists of a bimetallic strip made of two, bonded layers 2 and 3 of different material having different temperature coefficients of expansion causing the strip to bend in response to temperature change. A pair of fastening holes 4, as well as a hole 5 for mounting an electric contact, a valve element or the like, are provided. A small strip or tab 6 having a projecting end 7 is soldered to the layer 2, as shown. Layer 2, as well as the small strip 6 may be made of copper.

The bimetallic element 1 is held at the outer end 7 of the strip 6 by a holding tool or clamp and heated to a temperature above the melting point of the plastic material which is to be applied; it is then immersed vertically into a fluidized bed of plastic coating material. All those parts which were not covered by the holding tool are coated with a moisture proof, thin protective cover 8, which adheres to the element (FIG. 2).

In one embodiment of the invention the protective cover is made of epoxy resin and has a thickness of 0.1 mm. The free movement of the bimetallic element, in response to heat changes, is not affected at all, and the response speed of the bimetallic element was only slightly delayed. Similar results were obtained in another embodiment, in which with a 0.1 mm. thick protective cover of polyamides nylon 1111 was used.

What we claim and desire to be secured by Letters Patent is:

1. A bimetallic element for use in a wet and corrosive environment comprising a bimetallic strip made of two dissimilar metals having different temperature coefficients of expansion causing the strip to bend in response to temperature changes, a waterproof, corrosion-protective cover consisting of a coating of an elastic plastic material adhering tightly to said bimetallic strip and completely covering the strip, a small projecting tab of noncorrosive material on the bimetallic strip partly uncovered by said protective cover used in holding the bimetallic strip during coating thereof and said protective cover consisting of said elastic material having a thickness throughout protecting the bimetallic strip against moisture and corrosion and without substantial impedance of heat transfer while allowing bending of said bimetallic strip substantially without delay in response to temperature changes.

2. A bimetallic element according to claim 1, in which said protective cover has a thickness of 0.2 mm. or less.

3. A bimetallic element according to claim 1 in which said protective cover plastic material consists of epoxy resin.

4. A bimetallic element according to claim 1, in which said protective cover plastic material consists of polyamides.

References Cited

UNITED STATES PATENTS

| 3,291,935 | 12/1966 | Murphy et al. | 337—111 |
| 2,317,831 | 4/1943 | Vaughan et al. | 337—379 |

FOREIGN PATENTS 795,281  4/1958  United Kingdom.

BERNARD A. GILHEANY, Primary Examiner

DEWITT M. MORGAN, Assistant Examiner

U.S. Cl. X.R.

117—21; 337—111